Nov. 14, 1967  A. MICALE  3,352,266
PINKING KNIFE
Filed June 4, 1965

INVENTOR
ANGELO MICALE
BY *Lawrence L. Lerner*
ATTORNEY

United States Patent Office 3,352,266
Patented Nov. 14, 1967

3,352,266
PINKING KNIFE
Angelo Micale, 995 Nassau St.,
North Brunswick, N.J. 08902
Filed June 4, 1965, Ser. No. 461,410
4 Claims. (Cl. 112—122)

ABSTRACT OF THE DISCLOSURE

A pinking knife having a lower shearing plate with a replaceable insert, which insert extends under the upright members of the shear plate with the cutting edge of the insert being longer than the cutting edge of the upper pinking blade. Further, the lower shearing plate is provided with spacers for spacing it when desired with respect to the throw plate without leaving any space where goods can be caught.

In general, this invention relates to a new and improved pinking knife, and more particularly, to a pinking knife for a sewing machine which pinking knife includes replaceable blades.

My U.S. Patent 2,933,058 entitled, "Pinking Attachment for Sewing Machines," disclosed a pinking attachment for sewing machines which utilized replaceable blades. The replaceable blades in the above-mentioned patent were used to reduce the maintenance, repair and replacement expenses of then existing pinking attachments used on industrial sewing machines. Thus, the pinking blades utilized in the past required frequent replacements due to breakage and wear, and consequent frequent adjustments of new and resharpened parts. With the previous pinking attachments, the upper knife became dull and required frequent sharpening which involved loss of production time while the knife was taken out and a new one put in to replace it.

Also, the shearing plate, part of which constituted the lower knife, presented the same problem as the upper knife. Further, the apex of the V-cut of the shearing plate is necessarily close to the edge of the plate leaving an inherently weak spot which often breaks. This necessitated discarding the whole shearing plate. The shearing plate is an expensive unit and thus such replacement is costly. When the cutting edge of the shearing plate became dull, it had to be ground down for resharpening, making the shearing plate thinner and, to that extent, weakening the above-mentioned inherently weak spot at the apex of the V-cut.

All of the above-mentioned problems were solved in my Patent 2,933,058 by the provision of a replaceable upper and lower blades which were attached respectively to the knife and shearing plate. However, because of the nature of the movement of the pinking knife, i.e. arcuate movement during the cutting step, the pinking knife tended to move the lower blade on the shearing plate outwardly and, accordingly, caused misalignment of the lower blade with the shearing plate by reason of the wear on the four screws holding the lower blade in place. This outward thrust was further aided by the bunching of fabric at the vertical joint where the blade abutted the shearing plate. Additionally, the four screws were placed underneath the shearing plate which made them difficult to reach when replacement was necessary.

In my prior pinking attachment, the replaceable upper blade had a thickness which was approximately one-fourth the height of the upper knife. However, I have discovered that it is desirable to form the replaceable blade for the upper knife as thinly as possible while maintaining structural strength and sharpness. In this regard, the maximum thickness which I have found to be desirable for the upper knife replaceable blade is approximately one-sixth of the height of the upper knife per se. The tongue which extends longitudinally of the upper knife blade was designed with a height at least equal to the thickness of the blade so that there would be firm support for the now thin replaceable blade in the pinking knife.

Additionally, I have found that a pinker is often used for wider materials requiring the shearing plate to be displaced with respect to the throw plate. The space thus formed between the shearing plate and the throw plate often acts as a space within which goods are caught which, of course, ruins the particular run of goods. To avoid this problem, the present invention contemplates the use of a special spacer for use with the shearing plate to accurately fill the space between the shearing plate and the throw plate without the need for different sized shearing plates and which will prevent catching of goods when wider goods are being used.

In view of the foregoing, it is the general object of this invention to provide a new and improved pinking knife for a sewing machine.

Another object of this invention is the provision of a new and better pinking knife utilizing replaceable blades for the shearing plate and upper knife.

Still another object of this invention is the provision of a new and better pinking knife with an adjustable shearing plate for use with goods of varying widths.

An additional object of the present invention is the provision of a new and more inexpensive pinking knife which can utilize very thin replacement blades for the upper knife.

A still further object of the present invention is the provision of a new and better pinking knife which avoids unnecessary forces on the screws holding the replaceable lower blade to the shearing plate.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
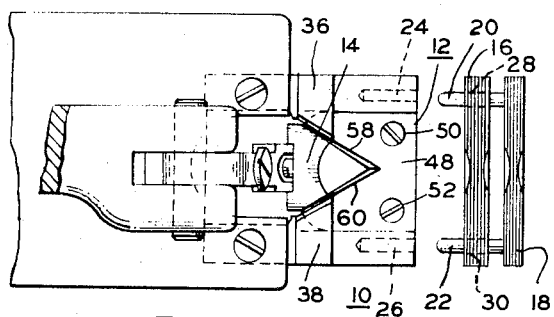
FIGURE 1 is a top plan view of the pinking knife of the present invention.
Figure 8:
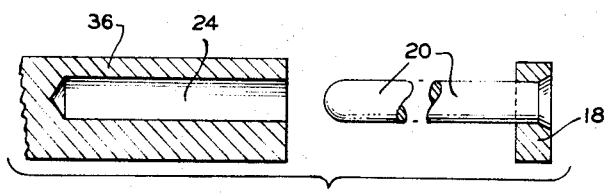
FIGURE 8 is fragmentary view showing the adjustment means for the shearing plate disclosed in FIGURE 1.

In FIGURE 1, there is shown the pinking attachment to the present invention generally designated by the numeral 10. The pinking attachment includes a shearing plate 12 and an upper pinking knife 14. The shearing plate 12 is placed on a throw plate (not shown) adjacent the feed slots thereof. A pair of spacers 16 and 18 for the shearing plate 12 are utilized to compensate for the position of the shearing plate 12 with respect to the feed slots of the throw plate. That is, as shown in FIGURE 8, the spacer 18 includes a pair of inwardly extending pins 20 and 22 which are adapted to fit in parallel holes 24 and 26 in the shearing plate 12. The spacer 16 is a flat member having a pair of holes 28 and 30 aligned with the holes 24 and 26. Thus, if the shearing plate 12 is to abut the feed slots, the spacers 16 and 18 are not used. If only a small space is intended between the shearing plate 12 and the feed slots, the spacer 18 will be placed with its pins 20 and 22 into the slots 24. The slots 24 and 26 are at least as long as the pins 20 and 22 so that the spacer 18 will abut the end of the shearing plate 12. If an even greater space is desired, the spacer 16 is placed over the pins 20 and 22 to widen the space between the shearing plate 12 and the feed slots of the throw plate. It will be understood that spacers of any size can be utilized in accordance with the teachings of the present invention.

The shearing plate 12 is cut away between its sides to receive in cutting relation the vertically reciprocal V-shape pinking knife 14, which knife includes an upper or stationary portion 32 and a lower or replaceable blade 34. The shearing plate 12 includes a pair of shoulders or upright parts 36 and 38 rising from the side portions of the plate and adjacent the open end of the V. These shoulders 36 and 38 limit the downward movement of the knife 14 and aid in guiding it.

Figure 6:
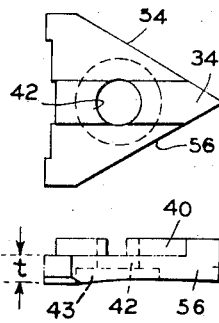
FIGURE 6 is a top plan view of the replaceable blade for the upper knife of the attachment of the present invention.
Figure 7:
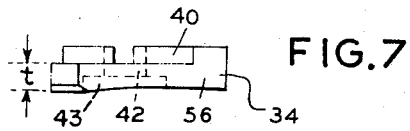
FIGURE 7 is a side view of the replaceable blade of FIGURE 6.
Figure 2:
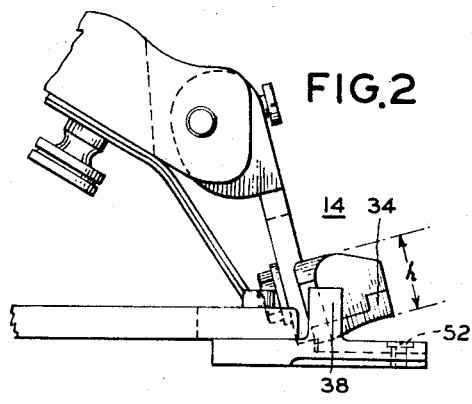
FIGURE 2 is a left side view of the pinking knife in FIGURE 1.
Figure 3:
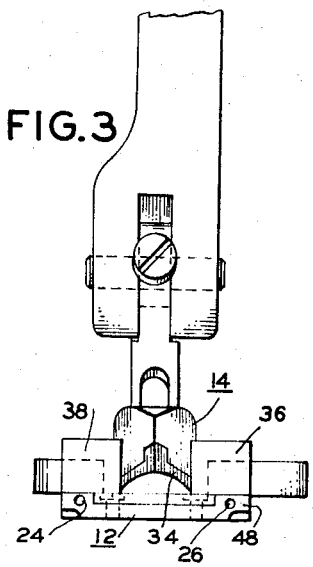
FIGURE 3 is a front view of the attachment of FIGURE 1.
Figure 4:
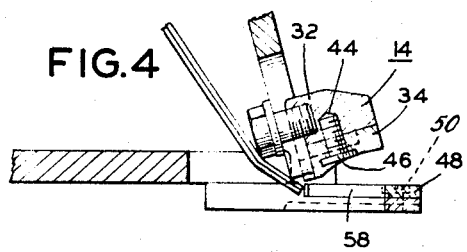
FIGURE 4 is a side view with portions broken away and in section of the attachment of FIGURE 2.
Figure 5:
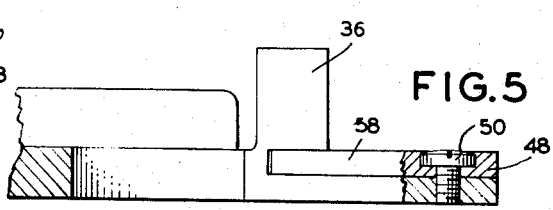
FIGURE 5 is a fragmentary side elevational view of the shirring plate utilized in the present invention.

As shown in FIGURES 6 and 7, the replaceable blade 34 is a thin member whose thickness i.e., the dimension $t$ is at least one-fifth of the overall height $h$ of the pinking knife 14. The knife 34 has a tongue 40 on the upper surface thereof, the height of which is at least equal to the thickness $t$ of the blade 34.

A vertical bore 42 is drilled centrally through the blade 34 and is axially aligned with an enlarged recess 43 on the under surface of the blade 34. The support member 32 of the knife 14 also includes a bore 44 aligned with the vertical bore 42 so as to receive a suitable bolt 46 for securing the blade 34 to the support 32. The upper or stationary part 32 of the knife 14 may be of ordinary steel, but the lower part or replaceable blade 34 is manufactured of a hard steel which will have a long life span and remain sharp during prolonged use. It is intended that the lower blade 34 will be replaced by merely moving the screw 46 and placing a new sharp blade 34 in its place. In view of the fact that the blade 34 is not to be sharpened, it is possible to keep the blade extremely thin, as stated previously, as the excess thickness that had been used in prior art devices is unnecessary in accordance with the teachings of the present invention. Further, by utilizing a tongue 40 having a thickness at least equal to the thickness of the blade, it is possible to achieve a strong joint between the blade and the stationary part of the pinking knife. Additionally, the tongue doubles the retaining area of the blade 34 with respect to the screw 46. Accordingly, it is the intention of this invention to provide a tongue whose thickness is at least equal to the thickness of the blade per se.

As shown in the drawings, the shearing plate 12 includes a separate blade 48 set in the upper surface of the main portion of the shearing plate 12, so as to be level therewith and with the throw plate. The blade 48 extends from the outer surface of the shearing plate 12 to points beneath the upright members 36 and 38. In the prior art devices, as shown in my U.S. Patent 2,933,058, the forward edges of the blade 48 extended from a point frowardly of the uprights rather than to a point beneath the uprights 36 and 38. The purpose of this construction will be discussed below.

The blade 48 is firmly secured to the main part of the shirring plate by two screws 50 and 52, the heads of the screws 50 and 52 being on the upper side of the blade 48. In this way, the blade 48 can be simply and easily removed.

The blade 48 has a V-cut and the edges of the blade forming this cut constitute the cutting edges which cooperate with the replaceable blade 34 in doing the pinking. It should be noted that the blade 34 has two cutting edges 54 and 56 forming the V-cut of the pinking knife 14. The blade 48 also has its two edges 58 and 60 which form the V-cut of the blade 48. Contrary to the prior art, the cutting edges 58 and 60 are equal in length to the cutting edges 54 and 56 of the upper blade. In the past, it was necessary to use at least four screws to hold the blade 48 in place. This was because the V-cut edges of the cutting blade were shorter than the pinking knife V-cutting edges forming a bunching point along the cutting surface which would create thrust against the blade 48 during the cutting process. By making the cutting edges 58 and 60 of the same length as the cutting edges 54 and 56, there has been eliminated this bunching point and, accordingly, thrust on the blade 48 has been substantially eliminated during the pinking process. Thus, only two screws 50 and 52 need be utilized in holding the blade 48 in place.

It will be noted that all of the advantages of the invention set forth in my prior Patent 2,933,058 have been maintained with the structure of the present invention while the additional advantages noted above have been added. That is, the present encompasses the use of a shearing plate which is divided into two parts, one of which is permanent and the other and lesser part involving the cutting edge is replaceable. The upper or reciprocating knife has been improved so that whenever a new upper knife blade is required, it is only necessary to replace the thin replaceable blade with a new and inexpensive one. The need for special sharpening of the pinking knife as required by the old unitary structures has been eliminated. Further, the replaceable shearing plate blade is operated without unnecessary thrust forces thereon by reason of the manufacture of the shearing plate blade with V-cutting edges equal in length to the cutting edges of the upper knife blade.

Still further, the shearing plate can be utilized with any width of fabric to be pinked without bunching of the fabric in the space between the shearing plate and the throw plate by utilizing the unique spacers of the present invention.

In a still further manner, the objects of the present invention have been achieved by the provision of the thin replaceable upper knife blade which is structurally integrated with the upper knife stationary support to provide a strong unit while still maintaining the advantages of inexpensive cost and long life. Although the replaceable upper knife blade has been shown with the screw head on the underside of the blade, it will be understood that the screw could extend downwardly through the stationary part, with the screw head resting on a recess in the upper surface of the stationary part, to engage the replaceable blade.

The present invention may be embodied in other specific forms without departing from the spirit or essential attributes thereof and, accordingly, reference should be made to the appended claims rather than to the foregoing specification as indicating the scope of the invention.

I claim as my invention:

1. In a pinking attachment for a sewing machine having an upper moveable knife and a fixed shearing plate, the combination of an upper replaceable V-shaped blade and a lower replaceable shearing plate insert, said insert having a V-shaped cutting edge cooperating with the cutting edge of said blade, said insert cutting edge being longer than said blade cutting edge whereby bunching of the material during the pinking operation is eliminated, said blade having means thereon enabling said blade to be secured to said upper moveable knife, said insert having means thereon enabling said insert to be secured to the lower shearing plate, said insert holding means having upright members adjacent to the open end of said V-shaped cutting edge, said shearing plate insert V-shaped cutting edge extending below the upright members and said upright members guiding said upper blade during a pinking operation.

2. A pinking attachment for a sewing machine having an upper movable knife and a fixed shearing plate, said shearing plate having a V-shaped cutting edge conforming to the shape of said movable knife, said shearing plate having a flat surface spaced from said V-shaped cutting edge and adapted to abut the feed slots of a throw plate, spacing means, said spacing means including a flat member having the same length and thickness as said flat surface, and means for locating and retaining the said spacing means between the feed slots of the throw plate and said flat surface whereby the distance between said shearing plate and said throw plate can be varied.

3. The pinking attachment of claim 2 wherein said means for locating and retaining said spacing means includes pins extending from said flat member, said flat surface having longitudinal bores extending therethrough into said shearing plate, said pins being positioned to fit within said flat surface bores to hold said spacing means in place.

4. The pinking attachment of claim 3 wherein said pins are parallel to one another and perpendicular to said flat member, said bores having a length at least equal to the length of said pins, and a second flat member, said second flat member having bores therethrough aligned with said bores in said flat surface, said second flat member having a thickness and length equal to that of said flat surface, said second flat member having a width less than the length of said pins, said second flat member being adapted to be telescoped over said pins to operate in combination with said first mentioned flat member to form a wide spacer for positioning between said flat surface and the feed slot of the throw plate.

References Cited
UNITED STATES PATENTS

| | | | |
|---|---|---|---|
| 2,165,312 | 7/1939 | Stevenson | 112—123 |
| 2,242,097 | 5/1941 | Weidauer | 112—122 |
| 2,666,486 | 1/1954 | Sigoda | 83—918 X |
| 2,933,058 | 4/1960 | Micale | 112—122 |

JORDAN FRANKLIN, *Primary Examiner.*

H. H. HUNTER, *Examiner.*